(12) United States Patent
Nagarajan et al.

(10) Patent No.: US 11,165,598 B2
(45) Date of Patent: Nov. 2, 2021

(54) SOURCE-ACTIVE COMMUNITY FOR IMPROVED MULTICASTING

(71) Applicant: Juniper Networks, Inc., Sunnyvale, CA (US)

(72) Inventors: Vikram Nagarajan, Bangalore (IN); Princy T. Elizabeth, Bangalore (IN); Michal Styszynski, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/722,348

(22) Filed: Dec. 20, 2019

(65) Prior Publication Data

US 2021/0194711 A1 Jun. 24, 2021

(51) Int. Cl.
*H04L 12/18* (2006.01)
*H04L 12/46* (2006.01)
*H04L 12/715* (2013.01)
*H04L 12/721* (2013.01)

(52) U.S. Cl.
CPC ........ *H04L 12/185* (2013.01); *H04L 12/1886* (2013.01); *H04L 12/4633* (2013.01); *H04L 12/4641* (2013.01); *H04L 45/04* (2013.01); *H04L 45/66* (2013.01)

(58) Field of Classification Search
None
See application file for complete search history.

(56) References Cited

U.S. PATENT DOCUMENTS

| 9,935,782 | B1 | 4/2018 | Rathi et al. | |
|---|---|---|---|---|
| 2014/0369345 | A1* | 12/2014 | Yang | H04L 12/18 370/355 |
| 2018/0034648 | A1* | 2/2018 | Nagarajan | H04L 69/325 |

OTHER PUBLICATIONS

Adams et al., "Protocol Independent Multicast—Dense Mode (PIM-DM): Protocol Specification (Revised)," Network Working Group, RFC 3973, Jan. 2005, 61 pp.
Fenner et al., "Protocol Independent Multicast—Sparse Mode (PIM-SIM): Protocol Specification (Revised)," Network Working Group, RFC 4601, Aug. 2006, 150 pp.
Holbrook et al., "Source-Specific Multicast for IP," Network Working Group, RFC 4607,The Internet Society, Aug. 2006, 19 pp.
Handley et al., "Bidirectional Protocol Independent Multicast (BIDIR-PIM)," Network Working Group, RFC 5015, Oct. 2007, 43 pp.

(Continued)

*Primary Examiner* — Huy D Vu
*Assistant Examiner* — Hong Shao
(74) *Attorney, Agent, or Firm* — Shumaker & Sieffert, P.A.

(57) ABSTRACT

This disclosure describes techniques for improved multicasting of source VLAN multicast traffic. For example, a method includes receiving, by a switch device within a data center of a leaf and spine network, multicast traffic from a multicast source; sending, by the switch device and to a border device within the data center that is communicatively coupled to a multicast rendezvous point external to the data center, a source-active routing message to indicate that the switch device is receiving multicast traffic from the multicast source; receiving, by the switch device and from the border device, a response routing message including an extended community that indicates whether there are any interested multicast receivers; and configuring, by the switch device, a forwarding engine of the switch device based on the extended community.

20 Claims, 4 Drawing Sheets

(56) References Cited

OTHER PUBLICATIONS

Extended Search Report from counterpart European Application No. 20213670.1, dated May 17, 2021, 8 pp.
Sajassi et al. "IGMP and MLD Proxy for EVPN; draft-ietf-bess-evpn-igmp-mld-proxy-04," BESS Working Group, Internet-Draft, Sep. 30, 2019, 32 pp.

* cited by examiner

SOURCE-ACTIVE COMMUNITY FOR IMPROVED MULTICASTING

TECHNICAL FIELD

This disclosure relates to computer networks.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities (sites).

Data centers are often made up of a large number of devices, including both servers and devices that form an Internet Protocol (IP) fabric. The IP fabric may be represented as an underlay network having leaf and spine devices. Leaf and spine devices may each participate in a Layer 2 virtual private network ("L2VPN") service, such as an Ethernet Virtual Private Network (EVPN). EVPN may be used to extend two or more layer two (L2) customer networks (e.g., customer networks located in different racks) through an intermediate layer three (L3) network (usually referred to as a provider network), in a transparent manner, i.e., as if the intermediate L3 network does not exist.

A network may support multicasting. Multicast traffic may include Internet Protocol Television (IPTV), desktop conferences, corporate broadcasts, music and video web casts, and other forms of multimedia content. The network may utilize protocol independent multicast (PIM) as a multicast routing protocol to control delivery of multicast traffic from multicast sources to multicast receivers for particular multicast groups.

SUMMARY

In general, this disclosure describes techniques for providing improved (e.g., optimized) multicasting of multicast traffic. In some examples, the techniques are described with respect to a data center comprising a network switch (e.g., top-of-rack (TOR) switch) that provides a multicast source with connectivity to the data center and one or more border devices that provide connectivity to devices external to the data center. Examples are described in which the TOR switch that begins to receive multicast traffic from the multicast source is configured to notify the border devices of the multicast source without flooding the multicast traffic to the data center fabric unless there are one or more multicast receivers either within the data center or external to the data center that are interested in the multicast traffic.

In one example, a TOR switch that receives multicast traffic from a multicast source sends a routing message ("source-active" routing message) including information to indicate that the TOR switch is receiving multicast traffic from the multicast source. In some examples, the source-active routing message is an EVPN Selective Multicast Etherent Tag (SMET) route (e.g., Type 6 route) that specifies the active multicast source and includes a source-active extended community (referred to herein as "source-active community" or "SA-COM") to indicate that the TOR switch is receiving multicast traffic from the multicast source. In other examples, the source-active routing message may represent a dedicated EVPN Source-Active Auto-Discovery (A-D) route (e.g., Type 10 route) to indicate that the TOR switch is receiving multicast traffic from the multicast source. When a border device of the data center receives the source-active routing message, the border device determines whether there are any interested multicast receivers. If there are no interested multicast receivers, the border device sends, for example, a SMET route including a prune extended community (referred to herein as "prune community" or simply "prune") to indicate there are no interested multicast receivers. In response to receiving the SMET route including the prune community, the TOR switch is configured to drop multicast traffic rather than sending the multicast traffic to the data center fabric toward the border device. If there is at least one interested multicast receiver internal to or external to the data center, the border device sends a SMET route including a join extended community (referred to herein as "join community") to indicate there is at least one interested multicast receiver. In response to receiving the SMET route including the join community, the TOR switch is configured to send multicast traffic to the data center fabric toward the border device. In this way, the TOR switch sends multicast traffic only if there is at least one interested multicast receiver.

The techniques may provide one or more technical advantages that realizes a practical application. For example, by implementing the techniques described in this disclosure, a TOR switch does not unnecessarily send multicast traffic to the border devices that would otherwise utilize core bandwidth even when there are no interested multicast receivers internal to or external to the data center. Moreover, by enabling the TOR switch to send multicast traffic only when there is at least one interested multicast receiver internal to or external to the data center, the load on the TOR switch may be reduced. Additionally, the techniques described in this disclosure avoids border devices from unnecessarily processing multicast traffic when there are no interested multicast receivers, which reduces load on the border devices.

In one example, a method includes receiving, by a switch device within a data center of a leaf and spine network, multicast traffic from a multicast source. The method also includes sending, by the switch device and to a border device within the data center that is communicatively coupled to a multicast rendezvous point external to the data center, a source-active routing message to indicate that the switch device is receiving multicast traffic from the multicast source. The method further includes receiving, by the switch device and from the border device, a response routing message including an extended community that indicates whether there are any interested multicast receivers. Moreover, the method includes configuring, by the switch device, a forwarding engine of the switch device based on the extended community.

In another example, a method includes receiving, by a border device within a data center, a source-active routing message from a switch device connected to a multicast source that indicates that the switch device is receiving multicast traffic from the multicast source. The method also includes determining, by the border device, whether there are any interested multicast receivers for the multicast traffic. The method further includes sending, by the border device and in response to determining whether there are any interested multicast receivers, a response routing message including an extended community to indicate whether there are any interested multicast receivers.

In another example, network device comprises: a plurality of ports, wherein each port is configured to be communicatively coupled to a respective network device of a plurality of network devices of a leaf and spine network; and one or more processors operably coupled to a memory, wherein the one or more processors are configured to: receive multicast traffic from a multicast source; send, to a border device within a data center that is communicatively coupled to a multicast rendezvous point external to the data center, a source-active routing message to indicate a multicast source that is communicatively coupled to the switch device is active; receive, from a border device, a response routing message including an extended community that indicates whether there are any interested multicast receivers external to the data center; and configure a forwarding engine of the network device based on the extended community.

In yet another example, a network device within a data center that is communicatively coupled to a multicast rendezvous point external to the data center, comprises: one or more processors operably coupled to a memory, wherein the one or more processors are configured to: receive, a source-active routing message from a switch device connected to a multicast source that indicates that the switch device is receiving multicast traffic from the multicast source; determine whether there are any interested multicast receivers for the multicast traffic; and send, in response to determining whether there are any interested multicast receivers, a response routing message including an extended community of a plurality of extended communities to indicate whether there are any interested multicast receivers.

The details of one or more examples are set forth in the accompanying drawings and the description below. Other features, objects, and advantages will be apparent from the description and drawings, and from the claims.

DETAILED DESCRIPTION

Figure 1:
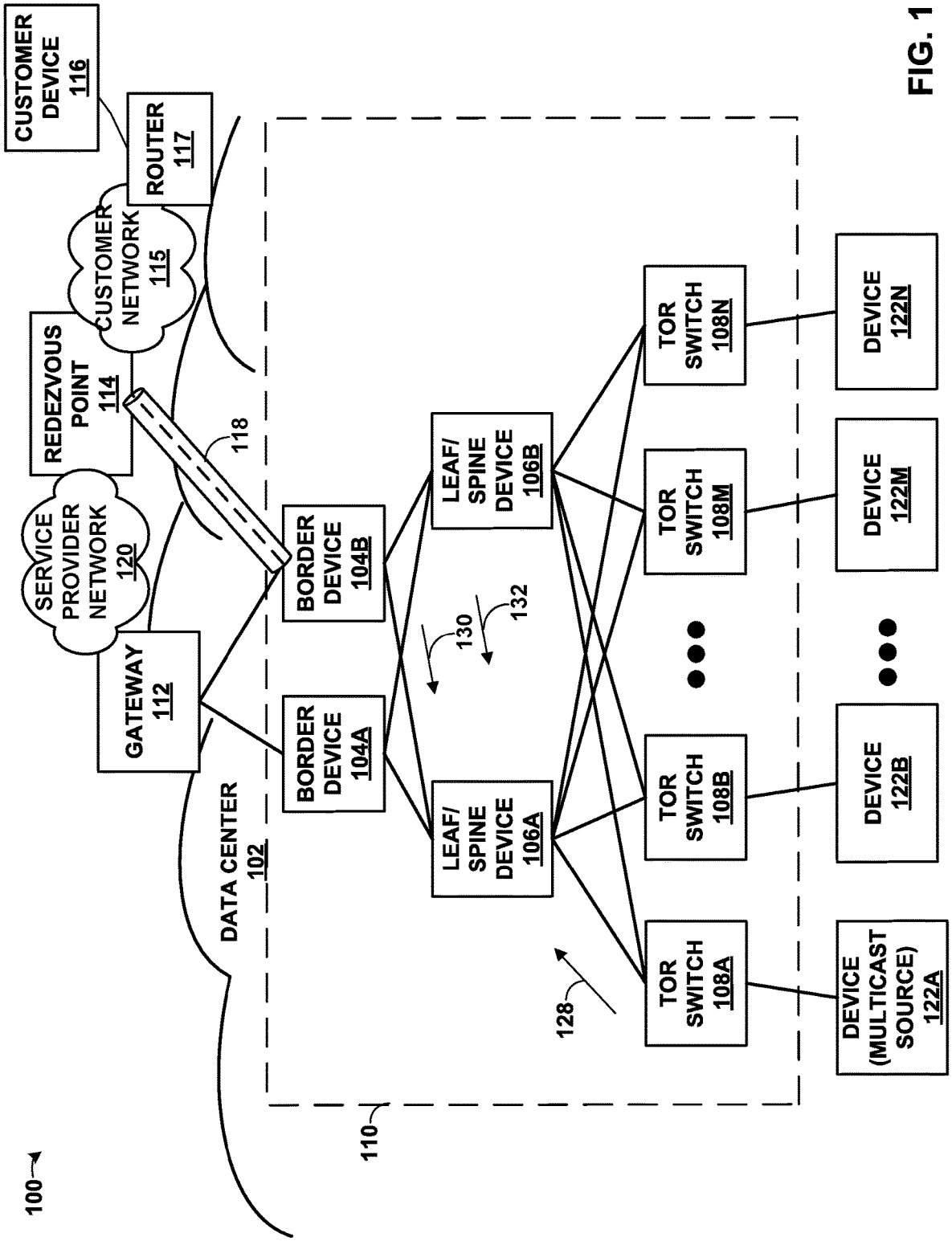
FIG. 1 is a block diagram illustrating an example network configured to provide improved multicasting of multicast traffic, in accordance with techniques described in this disclosure.

FIG. 1 is a block diagram illustrating an example network configured to provide improved (e.g., optimized) multicasting of multicast traffic, in accordance with techniques described in this disclosure. Network 100 in the example of FIG. 1 includes data center 102 interconnected with customer network 115 associated with one or more external customer devices 116 via a service provider network 120.

In the example of FIG. 1, network 100 comprises a customer network 115 that provides the one or more customer devices 116 with connectivity to data center 102 via service provider network 120. A customer may represent, for instance, an enterprise, a government, a residential subscriber, or a mobile subscriber. Customer devices 116 may be, for example, personal computers, laptop computers or other types of computing device associated with the customers. In addition, customer devices 116 may comprise mobile devices that access the data services of service provider network 120 via a radio access network (RAN). Example mobile subscriber devices include mobile telephones, laptop or desktop computers having, e.g., a 3G or 4G wireless card, wireless-capable netbooks, video game devices, pagers, smartphones, personal data assistants (PDAs) or the like. Each of customer devices 116 may run a variety of software applications, such as word processing and other office support software, web browsing software, software to support video calls, video games, video conferencing, and email, among others. In the example of FIG. 1, customer network 115 may operate independently from other networks, such as service provider network 120 and data center 102.

Service provider network 120 offers packet-based connectivity to customer devices 116 attached to customer network 115 for accessing data center 102. Service provider network 120 may be coupled to one or more networks administered by other providers, and may thus form part of a large-scale public network infrastructure, e.g., the Internet. Service provider network 120 represents a Layer 3 (L3) network, where reference to a layer followed by a number refers to a corresponding layer in the Open Systems Interconnection (OSI) model. Service provider network 120 is an L3 network in the sense that it natively supports L3 operations as described in the OSI model. Common L3 operations include those performed in accordance with L3 protocols, such as the internet protocol (IP). L3 is also known as a "network layer" in the OSI model and the "IP layer" in the TCP/IP model, and the term L3 may be used interchangeably with "network layer" and "IP" throughout this disclosure. Service provider network 120 may also implement Multi-Protocol Label Switching (MPLS) forwarding and, in such instances, may be referred to as an MPLS network or MPLS backbone. Service provider network 120 may alternatively be referred to as an "MPLS/IP core network" or "core network." Although service provider network 120 is illustrated as a single network between data center 102 and customer network 115, service provider network 120 may include multiple service provider networks to connect one or more customer devices 116 with data center 102.

Data center 102 may, for example, host infrastructure equipment, such as networking and storage systems, redundant power supplies, and environmental controls. In some examples, data center 102 may be individual network servers, network peers, or otherwise. In some examples, data center 102 is an enterprise or internal data center. As illustrated in the example of FIG. 1, data center 102 may be a facility that may provide network services for customer devices 116. For example, data center 102 may host web services for both enterprises and end users. Other example services may include data storage, virtual private networks, traffic engineering, file service, data mining, scientific- or super-computing, and so on. Customer devices 116 connect to gateway device 112 via customer network 115 and service provider network 120 to receive connectivity to services provided by data center 102. Gateway device 112 redirects traffic flows to and from data center 102 that provides the network services.

In this example, data center 102 includes a set of storage systems and application servers, e.g., devices 122A-122N (collectively, "devices 122"), interconnected via IP fabric 110 provided by one or more tiers of physical network switches and routers. Devices 122 function as compute nodes and/or servers of the data center. The term "compute nodes" and "servers" are used interchangeably herein to refer to devices 122.

In this example, IP fabric 110 (otherwise referred to herein as "data center fabric") represents layer two (L2) and layer three (L3) switching and routing components that provide point-to-point connectivity between devices 122. In one example, IP fabric 110 comprises a set of interconnected, packet-based routers and switches that implement various protocols. In one example, IP fabric 110 may comprise devices that provide IP point-to-point connectivity. In some multi-staged networks such as IP fabric 110, each switch resides in a defined layer of the network, referred to as a CLOS topology or a spine and leaf network. As shown in the example of FIG. 1, devices 106A and 106B may operate as either leaf or spine devices (collectively, "leaf/spine devices 106") that aggregate traffic flows and provide high-speed connectivity between leaf/spine devices 106.

Border devices 104A and 104B (collectively, "border devices 104") provide external access to data center 102 via service provider network 120 and inter-VLAN communication within data center 102. For example, border devices 104 provide devices 122 with connectivity to external devices (e.g., service provider network 120 or outside IP fabric 110) to route network traffic between data center 102 and external customer devices 116 via gateway device 112. Border devices 104 and leaf/spine devices 106 may each include one or more processors and a memory, and that are capable of executing one or more software processes. The configuration of network 100 illustrated in FIG. 1 is merely an example. For example, border devices 104 may in this example operate as border leaf devices, but may alternatively operate as a border spine device. Moreover, data center 102 may include any number of spine and leaf devices and border devices.

IP fabric 110 is provided by a set of interconnected network swtiches, e.g., top-of-rack (TOR) switches 108A-108N (collectively, "TOR switches 108"). In this example, TOR switches 108 provide devices 122 with connectivity to IP fabric 110 and service provider network 120. TOR switches 108 may be network devices that provide layer two (e.g., MAC) and/or layer 3 (e.g., IP) routing and/or switching functionality. TOR swtiches 108 may include one or more processors and a memory, and that are capable of executing one or more software processes.

In the example of FIG. 1, device 122A may operate as a source for multicast traffic (referred to herein as "multicast source 122A") to be delivered to one or more multicast groups. Multicast traffic is typically designated by a unique combination for a particular multicast group and a particular source for the multicast group. For example, multicast network traffic, such as a particular multicast stream of content, may be uniquely designated with a (Source, Group), i.e., (S, G), label to designate a source of the traffic, e.g., multicast source 122A, and a multicast group to which the traffic belongs.

Multicast receivers internal to data center 102, e.g., devices 122B-122N, and/or external to data center 102, e.g., customer device 116, that join the multicast group may receive multicast traffic sourced from multicast source 122A. In the example of FIG. 1, multicast receivers internal to data center 102 may implement Internet Group Management Protocol (IGMP) by which mutlicast receivers announce their interest in receiving particular multicast traffic. For example, multicast receivers may send IGMP reports to any immediately neighboring multicast routing devices to indicate their interest in receiving multicast traffic from multicast groups on a given virtual Local Area Network (VLAN). As one particular example, device 122B may operate as multicast receiver and use IGMP to send join and prune messages to an immediate network device, e.g., TOR switch 108B, which forwards the join and prune messages to border devices 104. In some examples, the multicast source and one or more multicast receivers may be configured with different VLANs. Border devices 104 maintain a multicast forwarding state of the multicast source and receivers and their associated VLANs to provide inter-VLAN multicasting within data center 102.

Border devices 104 and Rendezvous Point (RP) device 114 may provide multicast source 122A with communication to devices external to data center 102, e.g., customer device 116. RP device 114 serves as an information exchange point in which multicast traffic from a multicast source and join messages from routers of interested multicast receivers "rendezvous" at RP device 114. RP device 114 may represent a router, switch, virtual machine running on a router or other suitable network device.

Border devices 104, RP device 114, and router 117 may use one or more multicast control plane protocols, such as Protocol Independent Multicast (PIM), to exchange multicast information for building and modifying multicast distribution trees and to control delivery of multicast traffic from multicast sources to multicast receivers for particular multicast groups over a layer 3 network, e.g., service provider network 120 (e.g., external to data center 102). The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A. et al., "Protocol Independent Multicast Version 2-Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," RFC 4607, 2006; and Handley, M., et al., "Bidirectional Protocol Independent Multicast (BIDIRPIM)," RFC 5015, 2007, the entire contents of each of which are incorporated by reference herein.

As one example, an interested multicast receiver, e.g., customer device 116 may issue an IGMP join message to its designated router, e.g., router 117, which in turn sends a PIM (*, G) join message to RP device 114. The RP device 114 receives the PIM (*, G) join message and adds the interface on which it was received to the outgoing interface list (OIL) of the rendezvous-point tree (RPT) multicast forwarding state entry for (*, G). In this way, RP device 114 may forward multicast traffic for the group, G, to the interested multicast receiver. The RPT from RP device 114 to router 117 for customer device 116 remains in effect, even if no active multicast sources generate traffic.

In general, multicast forwarding state for (*, G) or (S, G) entries is the information by which network devices use for forwarding multicast traffic. S is the source IP address, G is the multicast group address, and * represents any source sending to multicast group G. Network devices may keep track of the multicast forwarding state for the incoming and outgoing interface for each multicast group. Multicast forwarding state for an entry stored by a network device may specify an output interface of the network device for multicast traffic matching the entry.

When a multicast source becomes active, the TOR switch connected to the source typically floods the multicast traffic to the data center fabric toward border devices 104, regardless of whether there is an interested multicast receiver. Border devices send, for example, PIM register messages to RP device 114 to register the active multicast source. In response to receiving a PIM register message, RP device 114 sends a PIM join message if there is an interested multicast receiver. For example, if RP device 114 has an interested multicast receiver for multicast group G in the PIM domain, RP device 114 may send, in response to receiving the PIM register message, a PIM (S, G) join message toward the multicast source to build a shortest-path tree (SPT) back to the multicast source, where S is the IP address of the multicast source that RP device 114 received as the source address. If there is no interested multicast receiver, RP device 114 sends a PIM prune message.

Because border devices 104 maintain the multicast state information, TOR switches do not have knowledge of whether there are any interested multicast receivers on different VLANs internal to the data center 102 or of any interested multicast receivers external to data center 102. When TOR switches receive multicast traffic from a multicast source, the TOR switches by default flood the multicast traffic to the data center fabric toward border devices 104 even though there may be no interested multicast receivers. Border devices determine whether there are any interested receivers, and if there are no interested multicast receivers, border devices drop the multicast traffic. By sending the multicast traffic even when there are no interested multicast receivers, bandwidth of the data center fabric is unnecessarily consumed, TOR switches experience extra replication load, and border devices experience extra processing load to process the multicast traffic that are to be dropped.

In accordance with techniques of this disclosure, devices of IP fabric 110 may provide improved multicasting of multicast traffic. In the example of FIG. 1, TOR switch 108A may be configured to notify the border devices of the multicast source without flooding the multicast traffic to the data center fabric unless there are one or more multicast receivers either within the data center or external to the data center that are interested in the multicast traffic. For example, in response to receiving multicast traffic from multicast source 122, TOR switch 108A may send a source-active routing message 128 to indicate a multicast source is active. In some examples, source-active routing message 128 may represent an EVPN Selective Multicast Etherent Tag (SMET) route (e.g., Type 6 route) that specifies the active multicast source and includes a source-active community to indicate that TOR switch 108A is receiving multicast traffic from multicast source 122. In other examples, source-active routing message 128 may represent an EVPN Source-Active Auto-Discovery (A-D) route (e.g., Type 10 route) that specifies the active multicast source to indicate that TOR switch 108A is receiving multicast traffic from multicast source 122.

When border device 104B receives source-active routing message 128, border device 104B determines whether there are any interested multicast receivers internal to or external to data center 102. For example, border device 104B may send a PIM register message to RP device 114 to indicate the multicast source, e.g., multicast source 122, is active. If there are any interested receivers external to data center 102, border device 104B receives a PIM join message from RP device 114 indicating the interested receivers. If there are no interested receivers external to data center 102, border device 104B receives a PIM prune message from RP device 114 indicating there are no interested receivers. Border device 104B may also perform a lookup of multicast state information to determine whether there are any multicast receivers internal to data center 102.

When there are no interested multicast receivers, border device 104B sends a response routing message, e.g., SMET route 130, including a prune extended community (referred to herein as "prune community" or simply "prune") to indicate there are no interested multicast receivers. In response to receiving the SMET route 130 including the prune community, TOR switch 108A is configured to drop multicast traffic rather than sending multicast traffic to border device 104. For example, TOR switch 108A may configure a forwarding engine of TOR switch 108A to drop multicast traffic that TOR switch 108A receives from the multicast source.

In some examples in which there is at least one interested multicast receiver, border device 104B sends a SMET route 132 including a join extended community (referred to herein as "join community") to indicate there is at least one interested multicast receiver. In response to receiving the SMET route 132 including the join community, TOR switch 108A is configured to send multicast traffic to the data center fabric toward border devices 104. For example, TOR switch 108A may send multicast traffic to border devices 104, which in send multicast traffic to the one or more interested receivers internal to or external to data center 102. In this way, TOR switch 108A may notify the border devices of the multicast source without flooding the multicast traffic to the data center fabric unless there are one or more multicast receivers either within the data center or external to the data center that are interested in the multicast traffic.

Figure 2:
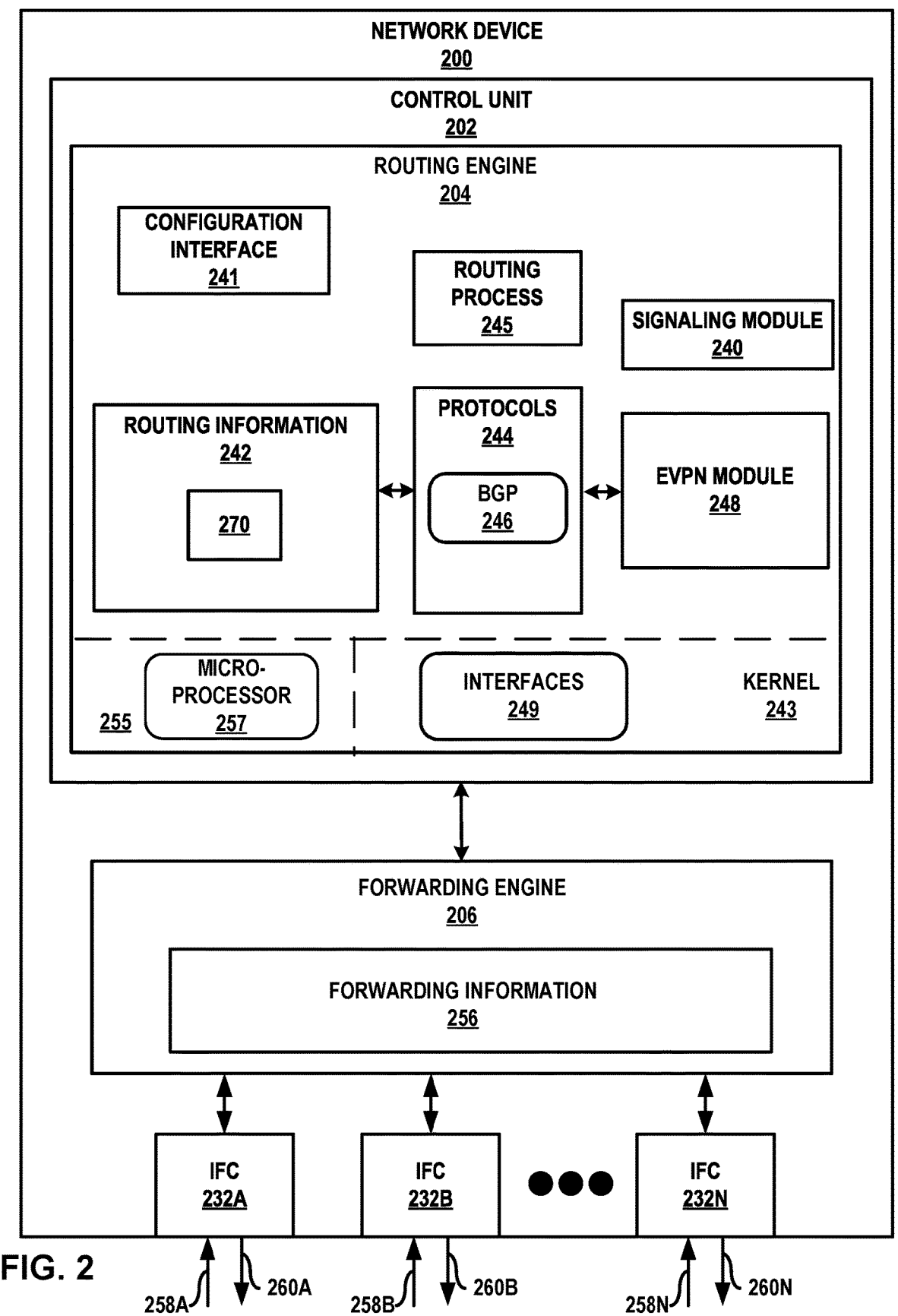
FIG. 2 is a block diagram illustrating an example of a switch device configured to provide improved multicasting of multicast traffic, in accordance with techniques described in this disclosure.

FIG. 2 is a block diagram illustrating an example of a switch device configured to provide improved multicasting of multicast traffic, in accordance with techniques described in this disclosure.

In one example, network device 200 may represent an example instance of TOR switch 108A of FIG. 1 or any device configured to receive and forward traffic from a multicast source and does not maintain a multicast forwarding state. In this example, network device 200 includes a control unit 202 that includes a routing engine 204, and control unit 202 is coupled to a forwarding engine 206. Forwarding engine 206 is associated with one or more of interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Interfaces for inbound links 258 and outbound links 260 may represent physical interfaces, logical interfaces, or some combination thereof. Interfaces for links 258, 260 may represent local interfaces of network device 200.

Elements of control unit 202 and forwarding engine 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols. Control unit 202, in some examples, retrieves and executes the instructions from memory for these aspects.

Routing engine 204 includes kernel 243, which provides a run-time operating environment for user-level processes. Kernel 243 may represent, for example, a UNIX operating system derivative such as Linux or Berkeley Software Distribution (BSD). Kernel 243 offers libraries and drivers by which user-level processes may interact with the underlying system. Hardware environment 255 of routing engine 204 includes microprocessor 257 that executes program instructions loaded into a main memory (not shown in FIG. 2) from a storage device (also not shown in FIG. 2) in order to execute the software stack, including both kernel 243 and processes executing on the operating environment provided by kernel 243. Microprocessor 257 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 243 provides an operating environment for a routing process 245 that executes various protocols 244 at different layers of a network stack, including protocols for implementing Ethernet Virtual Private Networks. For example, routing engine 204 includes network protocols that operate at a network layer of the network stack. In the example of FIG. 2, network protocols include the Border Gateway Protocol (BGP) 246, which is a routing protocol. Routing engine 204 may also include other protocols, such as an MPLS label distribution protocol and/or other MPLS protocols not shown in FIG. 2. Routing engine 204 is responsible for the maintenance of routing information 242 to reflect the current topology of a network and other network entities to which network device 200 is connected. In particular, routing protocols periodically update routing information 242 to accurately reflect the topology of the network and other entities based on routing protocol messages received by network device 200.

Kernel 243 includes an interfaces table 249 ("interfaces 249") that represents a data structure that includes a corresponding entry for each logical interface configured for network device 200. Logical interfaces may correspond to local interfaces of network device 200 for Ethernet segments. Entries for respective logical interfaces may specify respective current information describing the logical interfaces.

Routing information 242 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing engine 204 also includes an EVPN module 248 that performs L2 learning using BGP 246. EVPN module 248 may maintain tables for each EVPN instance (EVI) established by network device 200, or in alternative examples, may maintain one or more tables that are independent of each respective EVI. In some examples, network device 200 may use EVPN module 248 to advertise, e.g., EVPN routes, including Selective Multicast Ethernet Tag (SMET) (Type 6) routes to advertise information about the active multicast source. EVPN module 248 may further be configured to add an extended community (e.g., Source-Active Community) to a SMET route. In other examples, EVPN module 248 may alternatively, or additionally, send other EVPN routes, such as Ethernet A-D routes (Type 10) to indicate that a multicast source is active.

Signaling module 240 outputs control plane messages to automatically establish tunnels to interconnect multiple network devices including network device 200 and otherwise provision one or more EVIs configured for network device 200 and other network devices. Signaling module 240 may signal the network devices using one or more suitable tunnel signaling protocols, such as GRE, VXLAN, and/or MPLS protocols. Signaling module 240 can communicate with forwarding engine 206 to automatically update forwarding information 256. In some examples, signaling module 240 may be part of or executed by routing process 245.

Routing engine 204 also includes a configuration interface 241 that receives and may report configuration data for network device 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the network device 200, and other constructs that at least partially define the operations of network device 200, including the techniques described herein. For example, an administrator may, after powering-up, activating, or otherwise enabling network device 200 to operate within a network, interact with control unit 202 via configuration interface 241 to configure network device 200 to send a source-active routing message (e.g., SMET route including an extended community or EVPN Source-Active Auto-Discovery (A-D) route). Moreover, the administrator may interact with control unit 202 via configuration interface 241 to configure network device 200 to configure forwarding engine 206 to forward multicast traffic only if network device 200 receives, e.g., a SMET route including a join community, and to drop multicast traffic if network device 200 receives a SMET route including a prune community, as described in this disclosure.

Routing process 245 may use EVPN module 248 to generate EVPN routes and send and receive, via BGP 246 sessions with other network devices, the EVPN routes. For example, EVPN module 248 uses BGP 246 to generate a SMET route (Type 6) including a source-active community to indicate network device 200 is receiving multicast traffic from the multicast source. Alternatively, or additionally, EVPN module 248 uses BGP 246 to generate an EVPN Source-Active Auto-Discovery (A-D) route (Type 10) to indicate network device 200 is receiving multicast traffic from the multicast source.

Routing process 245 may store generated EVPN routes and import/store received EVPN routes to a route table storing EVPN routes 270 in routing information 242. For example, in response to receiving a SMET route including a prune community, routing process 245 may store the SMET route including the prune community in routing information 242, as EVPN route 270. Alternatively, or additionally, in response to receiving a SMET route including a join community, routing process 245 may store the SMET route including the join community in routing information 242, as EVPN route 270. In some examples, routing process 245 may store information in routing information 242 that indicates whether there is at least one interested multicast receiver.

Forwarding engine 206 represents hardware and logic functions that provide high-speed forwarding of network traffic. Forwarding engine 206 typically includes a set of one or more forwarding chips programmed with forwarding information 256 that maps network destinations with specific next hops and the corresponding output interface ports. In general, when network device 200 receives a packet via one of inbound links 258, forwarding engine 206 identifies an associated next hop for the data packet by traversing the programmed forwarding information 256 based on information within the packet. Forwarding engine 206 forwards the packet on one of outbound links 260 mapped to the corresponding next hop.

In the example of FIG. 2, forwarding engine 206 includes forwarding information 256. In accordance with routing information 242, forwarding engine 206 stores forwarding information 256 that maps packet field values to network destinations with specific next hops and corresponding outbound interface ports. For example, routing engine 204 analyzes routing information 242 and generates forwarding information 256 in accordance with routing information 242. Forwarding information 256 may be maintained in the form of one or more tables, link lists, radix trees, databases, flat files, or any other data structures.

Forwarding engine 206 stores forwarding information 256 for each EVI established by network device 200 to associate network destinations with specific next hops and the corresponding interface ports. Forwarding engine 206 forwards the data packet on one of outbound links 260 to the corresponding next hop in accordance with forwarding information 256. At this time, forwarding engine 206 may push and/or pop labels from the packet to forward the packet along a correct label switched path.

In accordance with the EVPN routes 270 in routing information 242, forwarding engine 205 is configured to either forward multicast traffic or to drop multicast traffic. For example, if EVPN routes 270 includes a SMET route including a join community, forwarding engine 205 is configured to send multicast traffic, e.g., to one or more outbound interface ports that is used to send multicast traffic to the data center fabric toward one or more border devices. In this way, when network device 200 receives multicast traffic via one of inbound links 258, forwarding engine 206 traverses the programmed forwarding information 256, and sends the multicast traffic to the one or more outbound interface ports that are used to forward traffic to the data center fabric toward border devices. Alternatively, if EVPN routes 270 includes a SMET route including a prune community, forwarding engine 205 is configured to drop multicast traffic. In this way, when network device 200 receives multicast traffic via one of inbound links 258, forwarding engine 206 does not identify a next hop for the multicast traffic by traversing the programmed forwarding information 256, and drops the multicast traffic.

Figure 3:
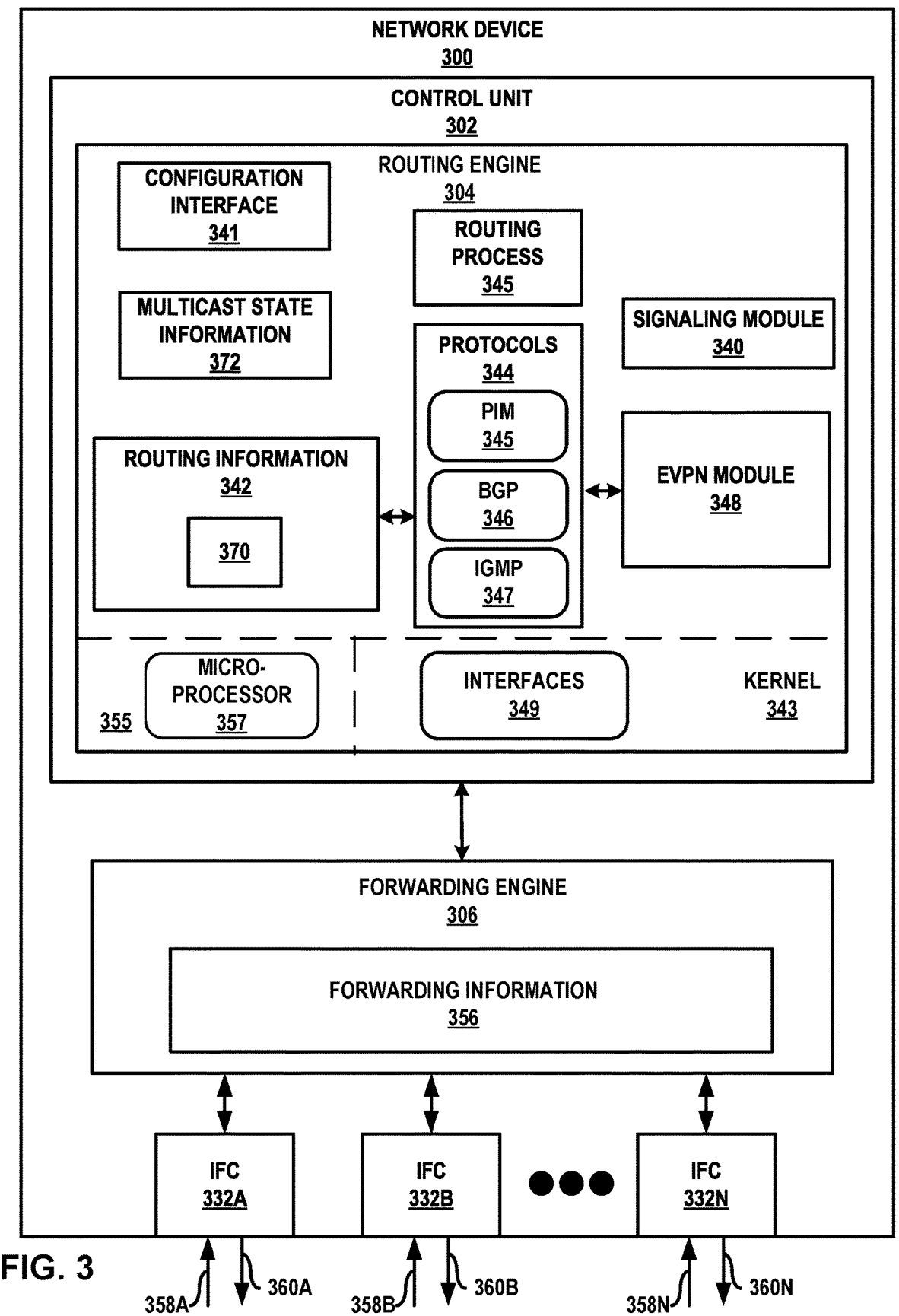
FIG. 3 is a block diagram illustrating an example of a border device configured to provide improved multicasting of multicast traffic, in accordance with techniques described in this disclosure.

FIG. 3 is a block diagram illustrating an example of a border device configured to provide improved multicasting of multicast traffic, in accordance with techniques described in this disclosure. In one example, network device 300 may represent an example instance of border device 104B of FIG. 1. Network device 300 may include similar engines, units, and/or modules as described with respect to the example network device 200 of FIG. 2, except as described below.

In this example, protocols 344 of network device 300 includes Protocol Independent Multicast (PIM) 345 to exchange multicast information for building and modifying multicast distribution trees and control delivery of multicast traffic from multicast sources to multicast receivers for particular multicast groups over a service provider network (e.g., service provider network 120 of FIG. 1). For example, network device 300 maintains multicast state information 372 for multicast receivers internal to or external to the data center. To maintain multicast state information for multicast receivers external to the data center, network device 300 uses PIM 345 to send PIM register messages indicating a multicast source is active. Network device 300 sends the PIM register messages over a layer 3 network to an RP device (e.g., RP device 114 of FIG. 1) external to the data center. Network device 300 receives PIM join/prune messages from the RP device for external multicast receivers and stores the information in multicast state information 372.

Protocols 344 of network device 300 also includes Internet Group Management Protocol (IGMP) 347. For example, network device 300 receives IGMP join/prune messages from network devices (e.g., TOR switches 108 connected to an interested multicast receiver and stores the information in multicast state information 372. Multicast state information 372 may include VLANs associated with multicast sources and multicast receivers to provide inter-VLAN multicasting. Multicast state information 372 may represent a table, list, index, or other data structure for storing multicast state information.

In accordance with the techniques described in this disclosure, network device 300 may receive a source-active routing message (e.g., SMET route including source-active community or EVPN Source-Active A-D route) from TOR switch 108A. In response to receiving a SMET route including a source-active community or an EVPN Source-Active A-D route, network device 300 determines whether there are any interested multicast receivers external to the data center. For example, network device 300 may perform a lookup of its multicast state information 372 to determine if there are any interested multicast receivers for the multicast source identified by the source-active routing message.

If there are no interested external multicast receivers, routing process 345 uses EVPN module 348 to send a SMET route including a prune community to indicate that there are no interested multicast receivers. If there is at least one interested multicast receiver, routing process 345 uses EVPN module 348 to send a SMET route including a join community to indicate that there is at least one interested multicast receiver.

Figure 4:
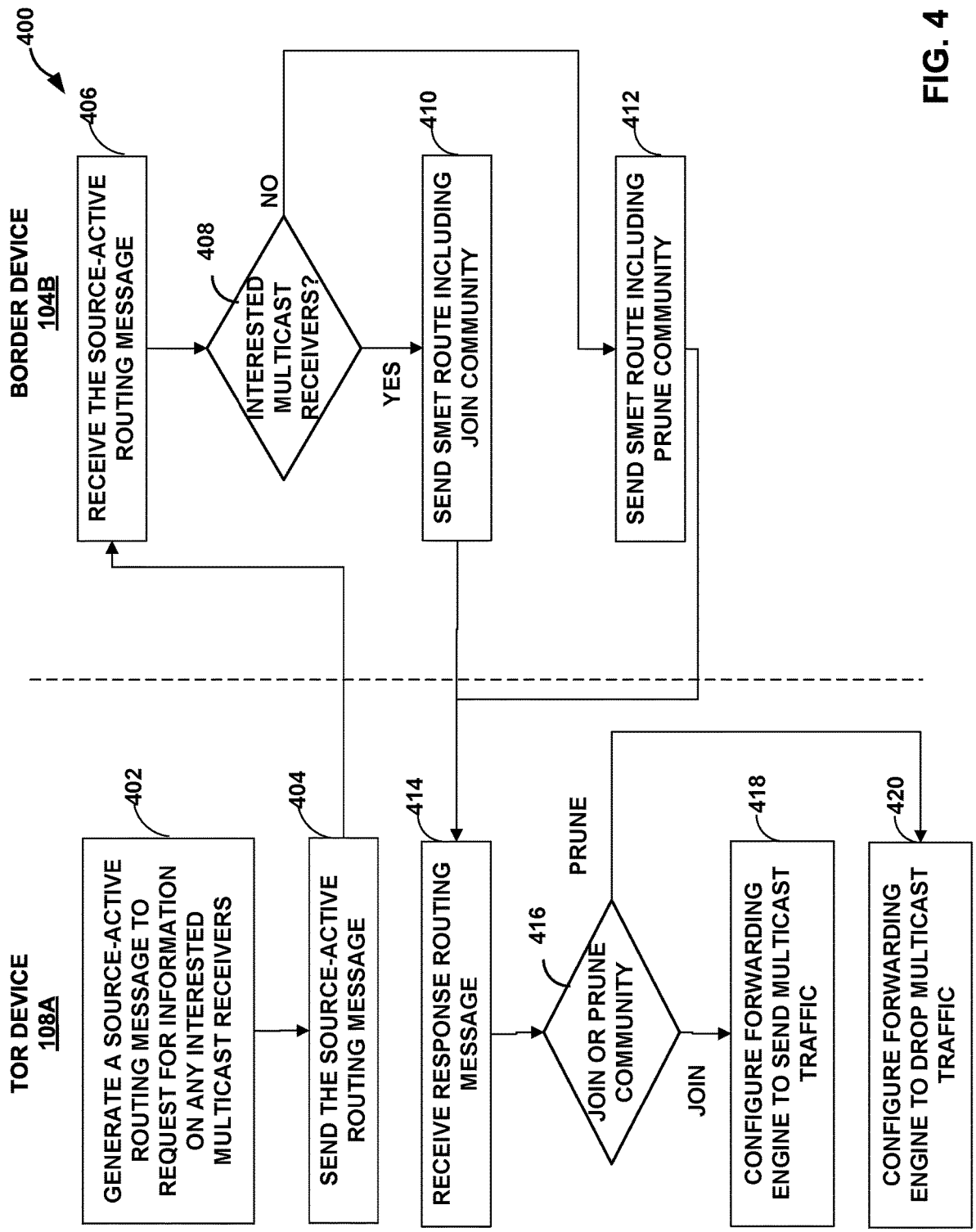
FIG. 4 is a flowchart illustrating an example method for improving multicasting of multicast traffic, in accordance with techniques described in this disclosure.

FIG. 4 is a flowchart illustrating an example method 400 for improving multicasting of multicast traffic, in accordance with the techniques described in this disclosure. The method of FIG. 4 is explained with respect to TOR switch 108 and border device 104 of FIG. 1. The method of FIG. 4 is only one example and need not necessarily be performed in the order shown.

In the example of FIG. 4, TOR switch 108A generates a source-active routing message as an indication that TOR switch 108A (402). As one example, TOR switch 108A is configured to generate a SMET route including a source-active extended community to indicate a multicast source is active (e.g., that TOR switch 108A is receiving multicast traffic from the multicast source). In other examples, TOR switch 108A is configured to generate an EVPN Source-Active Auto-Discovery route (Type 10) to indicate a multicast source is active.

TOR switch 108A sends the source-active routing message (404). In response to receiving the source-active routing message (406), border device 104B determines if there are any interested multicast receivers (408). For example, border device 104B may send a PIM register message to RP device 114 to register the active multicast source. In response to receiving a PIM register message, RP device 114 sends a PIM join/prune message based on whether there is an interested multicast receiver. Border device 104B stores the multicast state information. Using the multicast state information, border device 104B may perform a lookup of its multicast state information to determine if there are any interested multicast receivers for the multicast source identified by the source-active routing message. If there is at least one interested multicast receiver ("YES" of step 408), border device 104B sends a response routing message, e.g., SMET route including a join community to TOR switch 108A (410). If there are no interested multicast receivers ("NO" of step 408), border device 104B sends a response routing message, e.g., SMET route including a prune community to TOR switch 108A (412).

In response to receiving the response routing message (414), TOR switch 108A determines whether the response routing message includes a join community or prune community (416). If the SMET route includes a join community ("JOIN" of step 416), TOR switch 108A configures the forwarding engine to send multicast traffic (418). For example, TOR switch 108A may flood the multicast traffic toward the data center fabric toward border devices 104. If the SMET route includes a prune community ("PRUNE" of step 416), TOR switch 108A configures the forwarding engine to drop the multicast traffic (420).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
   receiving, by a switch device within a data center of a leaf and spine network, multicast traffic from a multicast source;
   in response to receiving the multicast traffic from the multicast source and without flooding the multicast traffic into the data center, sending, by the switch device and to a border device within the data center that is communicatively coupled to a multicast rendezvous point external to the data center, a source-active routing message to indicate that the switch device is receiving the multicast traffic from the multicast source;
   receiving, by the switch device and from the border device, a response to the source-active routing message including an extended community that indicates whether there are any interested multicast receivers; and
   configuring, by the switch device and based on the extended community included in the response, a forwarding engine of the switch device to one of forward the multicast traffic into the data center or drop the multicast traffic.

2. The method of claim 1,
   wherein the source-active routing message comprises a Selective Multicast Ethernet Tag (SMET) route including a source-active community to indicate that the switch device is receiving the multicast traffic from the multicast source.

3. The method of claim 1,
   wherein the source-active routing message comprises an Ethernet Virtual Private Network (EVPN) source-active auto-discovery routing message to indicate that the switch device is receiving the multicast traffic from the multicast source.

4. The method of claim 1,
   wherein receiving the response to the source-active routing message including the extended community comprises receiving a Selective Multicast Ethernet Tag (SMET) route including a join community to indicate that there is at least one interested multicast receiver, wherein configuring the forwarding engine of the switch comprises configuring the forwarding engine to forward the multicast traffic.

5. The method of claim 1,
wherein receiving the response to the source-active routing message including the extended community comprises receiving a Selective Multicast Ethernet Tag (SMET) route including a prune extended community to indicate that there are no interested multicast receivers,
wherein configuring the forwarding engine of the switch comprises configuring the forwarding engine to drop the multicast traffic.

6. A method comprising:
receiving, by a border device within a data center, a source-active routing message from a switch device connected to a multicast source that indicates that the switch device is receiving multicast traffic from the multicast source;
determining, by the border device, whether there are any interested multicast receivers for the multicast traffic; and
sending, by the border device and in response to determining whether there are any interested multicast receivers, a response to the source-active routing message including an extended community to indicate whether there are any interested multicast receivers.

7. The method of claim 6,
wherein the source-active routing message comprises a Selective Multicast Ethernet Tag (SMET) route including a source-active community to indicate that the switch device is receiving the multicast traffic from the multicast source.

8. The method of claim 6,
wherein the source-active routing message comprises an Ethernet Virtual Private Network (EVPN) source-active auto-discovery routing message to indicate that the switch device is receiving the multicast traffic from the multicast source.

9. The method of claim 6,
wherein determining whether there are any interested multicast comprises performing a lookup of a multicast distribution tree to determine if there are any interested multicast receivers for the multicast source identified by the source-active routing message.

10. The method of claim 6,
wherein the response to the source-active routing message comprises a Selective Multicast Ethernet Tag (SMET) route including a join community to indicate that there is at least one interested multicast receiver.

11. The method of claim 6,
wherein the response to the source-active routing message comprises a Selective Multicast Ethernet Tag (SMET) route including a prune community to indicate that there are no interested multicast receivers.

12. The method of claim 6, further comprising:
sending, by the border device and to a multicast rendezvous point external to the data center, a Protocol Independent Multicast (PIM) register message to register the multicast source.

13. A network device comprising:
a plurality of ports, wherein each port is configured to be communicatively coupled to a respective network device of a plurality of network devices of a leaf and spine network; and
one or more processors operably coupled to a memory, wherein the one or more processors are configured to:
receive multicast traffic from a multicast source;
send, in response to receiving the multicast traffic from the multicast source and without flooding the multicast traffic into the datacenter, to a border device within a data center that is communicatively coupled to a multicast rendezvous point external to the data center, a source-active routing message to indicate that the network device is receiving the multicast traffic from a multicast source that is communicatively coupled to the network device;
receive, from the border device, a response to the source-active routing message including an extended community that indicates whether there are any interested multicast receivers external to the data center; and
configure, based on the extended community included in the response, a forwarding engine of the network device to one of forward the multicast traffic into the data center or drop the multicast traffic.

14. The network device of claim 13,
wherein the source-active routing message comprises a Selective Multicast Ethernet Tag (SMET) route including a source-active community to indicate that the network device is receiving the multicast traffic from the multicast source.

15. The network device of claim 13,
wherein the source-active routing message comprises an Ethernet Virtual Private Network (EVPN) source-active auto-discovery routing message to indicate that the network device is receiving the multicast traffic from the multicast source.

16. The network device of claim 13,
wherein, to receive the response to the source-active routing message including the extended community, the one or more processors are configured to receive a Selective Multicast Ethernet Tag (SMET) route including a join community to indicate that there is at least one interested multicast receiver, and
wherein, to configure the forwarding engine of the network device, the one or more processors are configured to configure the forwarding engine to forward the multicast traffic.

17. The network device of claim 13,
wherein, to receive the response to the source-active routing message including the extended community, the one or more processors are configured to receive a Selective Multicast Ethernet Tag (SMET) route including a prune community to indicate that there are no interested multicast receivers, and
wherein, to configure the forwarding engine of the network device, the one or more processors are configured to configure the forwarding engine to drop the multicast traffic.

18. A network device within a data center that is communicatively coupled to a multicast rendezvous point external to the data center, comprising:
one or more processors operably coupled to a memory, wherein the one or more processors are configured to:
receive, a source-active routing message from a switch device connected to a multicast source that indicates that the switch device is receiving multicast traffic from the multicast source;
determine whether there are any interested multicast receivers for the multicast traffic; and
send, in response to determining whether there are any interested multicast receivers, a response to the source-active routing message including an extended community to indicate whether there are any interested multicast receivers.

19. The network device of claim 18, wherein the response to the source-active routing message comprises a Selective Multicast Ethernet Tag (SMET) route including a join community to indicate that there is at least one interested multicast receiver.

20. The network device of claim 18, wherein the response to the source-active routing message comprises a Selective Multicast Ethernet Tag (SMET) route including a prune community to indicate that there are no interested multicast receivers.

* * * * *